(12) United States Patent
Gunshinan et al.

(10) Patent No.: US 6,415,502 B1
(45) Date of Patent: Jul. 9, 2002

(54) GOLF CLUB GRIP ALIGNMENT APPARATUS

(75) Inventors: Frank D. Gunshinan; Nicholas Gilbert, both of Glendale, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 09/567,923

(22) Filed: May 10, 2000

(51) Int. Cl.$^7$ .................. B23P 21/00; B23Q 17/00; B23B 27/14; G01B 1/00; G01D 21/00
(52) U.S. Cl. .................. 29/714; 29/712; 29/407.01; 29/271; 33/508; 33/645
(58) Field of Search .................. 29/714, 712, 464, 29/281.1, 407.01, 234, 235, 271, 282; 33/533, 508, 645, 666; 269/300; 336/45, 706

(56) References Cited

U.S. PATENT DOCUMENTS

| 5,412,583 A | * | 5/1995 | Cameron et al. ........... 364/508 |
| 5,870,815 A | | 2/1999 | Karner et al. .............. 29/407.1 |

* cited by examiner

Primary Examiner—S. Thomas Hughes
Assistant Examiner—John C. Hong
(74) Attorney, Agent, or Firm—Darrell F. Marquette

(57) ABSTRACT

An apparatus for receiving a golf club and positioning the head of the club and holding it in a predetermined position and providing a visual indication of that position at a location proximate the extending end of the golf club shaft so that an installer can properly align a grip that is to be installed on the shaft of the club. The apparatus includes a golf club holding mechanism, a club head positioning device, a club head position indicator, an aligner mechanism and a circuit by which the installer controls and monitors the operation of the apparatus.

20 Claims, 6 Drawing Sheets

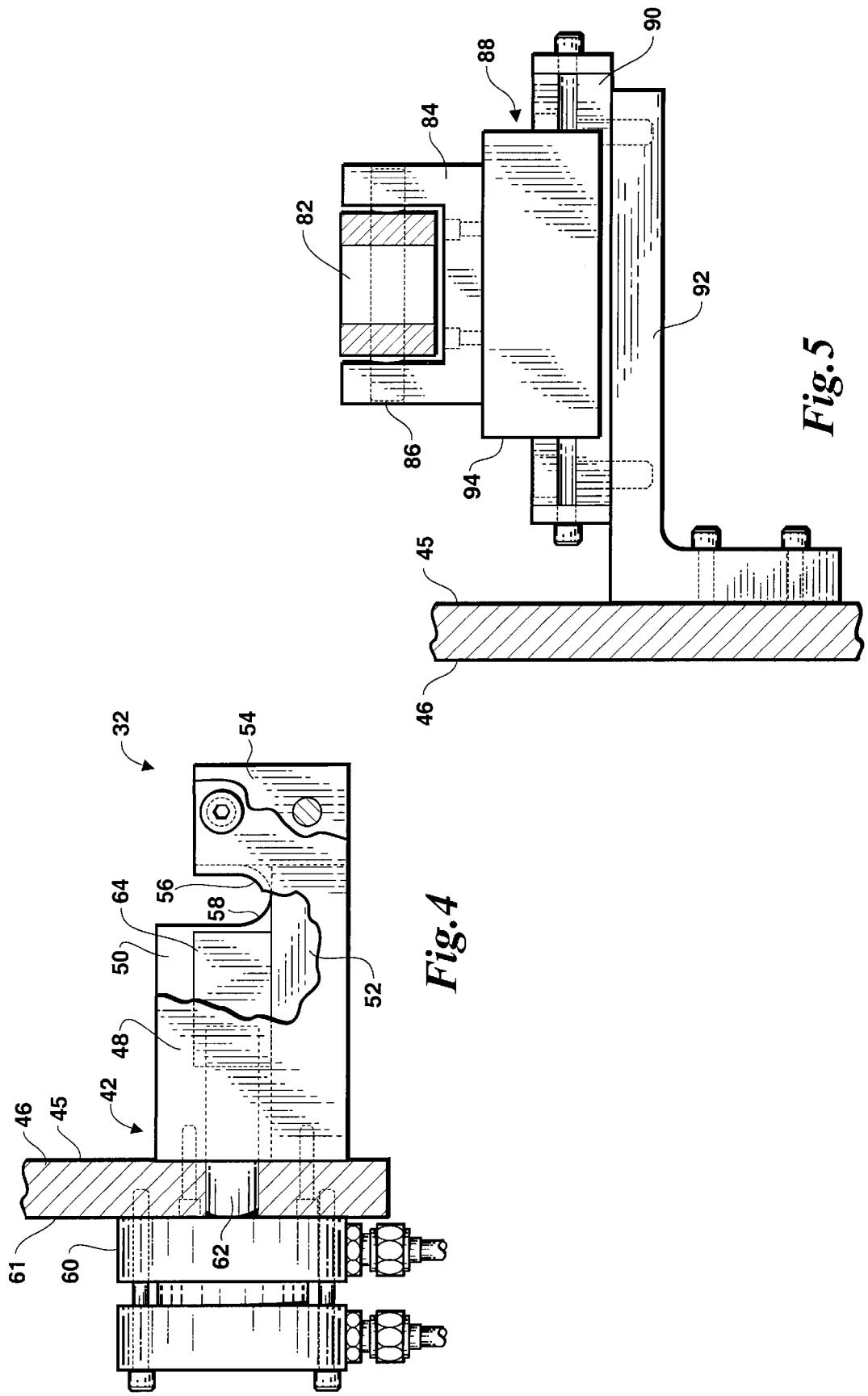

GOLF CLUB GRIP ALIGNMENT APPARATUS

BACKGROUND OF THE INVENTION

Field of the Invention

This invention relates in general to assembly fixtures and more particularly to an apparatus for aligning golf club grips during the assembly process.

Most, if not all golf club grips are molded with a perceptible ridge running longitudinally of the grip and that ridge is provided to help a golfer line up the club in preparation for hitting a golf ball. When a right handed golfer wraps his left hand around the golf club, a crease will be formed across the aligned knuckles of the fingers of his or her folded hand and the ridge of the golf club grip will nestle into the crease. When such a relationship between the ridge and the golfers hand exists, and other variables such as the golfers stance are proper, the face of the golf club should be lined up in a perpendicular attitude relative to the intended flight path of the golf ball. In order for such alignment of the golf club face to occur, the golf club grip must be installed on the shaft of the club in a correct manner. The ridge provided on the grip must face the ground and lie in a plane perpendicular to the ground when the club is held in the ball addressing position and that plane must be parallel to the leading edge formed at the intersection of the club face and the sole of the club. Another way of saying this is that when the club is being held in the address position, the ridge of the grip must be on the underside of the golf club shaft and both the ridge and the leading edge of the golf club must be perpendicular to the intended flight path of the golf ball. If the golf club grip is improperly installed, even if it is only off a few degrees, the club will be gripped in an open or closed attitude and the golfer may not even be aware of such a condition.

To assist the grip installer, most grips are provided with a small alignment mark or marks on the side of the grip which is diametrically opposed to the ridge. The installer visually aligns the alignment mark with the leading edge of the golf club face while installing the grip and since the alignment mark and the leading edge are quite a distance apart, mis-aligned grip installation can and often does occur.

A grip alignment mechanism is disclosed in U.S. Pat. No. 5,870,815 issued to Karner et al. Among the shortcomings of this prior art mechanism is the use of a device which includes a spaced pair of vertically aligned pair of rails to define the alignment position of the golf club upon which a grip is to be installed. When installing a grip, the operator of the mechanism places the club in the mechanism and rotates it about its shaft axis to bring the leading edge of the club head into engagement with the vertical plane defined by the pair of rails. When aligned in this manner, the operator then actuates a clamp which holds the club, and a laser beam is used to provide alignment indicia to guide the operator in installation of the grip. Because golf clubs have different off-sets, as will hereinafter be described in detail, the device on which the pair of rails are mounted is movable and the entire device will automatically move when contacted by the leading edge of the club head. Such movement will occur during rotational movement of the golf club prior to the leading edge of the head coming into contact with both of the rails and can continue if the club is rotated beyond the essential vertical positioning of the leading edge of the club head. This prior art device is not provided with a golf club head positioning capability and therefore relies solely on the skill and attentiveness of the operator.

Therefore, a need exist for a new and useful golf club grip installation apparatus which overcomes some of the installation problems and the shortcomings of the prior art.

SUMMARY OF THE INVENTION

In accordance with the present invention, a new and useful apparatus is disclosed for aiding an installer in positioning a golf club grip in a properly aligned position on the shaft of a golf club.

The apparatus includes a holding mechanism having two separate clamps for receiving and holding a golf club during the alignment and grip installation process. The first clamp is a hosel clamp and the second is a shaft clamp with these clamps being spaced apart and in alignment with each other. When the clamps of the golf club holding mechanism are in the unclamped state and a golf club to be gripped is placed therein, the alignment process is started by rotating the golf club about the longitudinal axis of its shaft to bring the leading edge, formed at the intersection of the face and the sole of the club head, into a vertical position. Rotation of the golf club into the vertically disposed position may be done by hand, however use of a golf club positioning device is preferred. The disclosed golf club positioning device is actuated when the grip installer depresses a clamp switch provided on the panel of a control circuit and holds it in the depressed position. The club positioning device will then move into engagement with the golf club head to rotate the club into the desired vertical position.

An electromechanical golf club position indicator is provided for sensing when the golf club being rotated reaches the vertical position and when this condition is sensed, the position indicator produces a signal to automatically energize the hosel clamp and the shaft clamp of the golf club holding mechanism and de-energize the golf club positioning device.

In addition to the above described golf club holding mechanism, the positioning device and the position indicator, the apparatus of the present invention further includes a grip aligner which is an elongated structure that extends from proximate the head of a golf club held by the holding mechanism to proximate the extending end of the golf club shaft. The aligner is positioned and configured to provide the installer with a visual indication of the proper alignment position for the grip. The grip aligner can be adjusted for custom grip installations wherein the grip can be installed in a selected one of a plurality incrementally rotated positions on the club shaft so that a golfer will hold the club in a desired open or closed position.

The hereinbefore mentioned control circuit is provided so that the installer is able to control the functions of the grip alignment apparatus and monitor the status of the automatic operations thereof. With the golf club firmly held by the hosel and shaft clamps and the grip aligner mechanism indicating the desired grip alignment position, the installer can precisely align and install the grip on the shaft of the club.

The novel features of the present invention are set forth with particularity in the appended claims and the invention will be more fully understood from the following description when read in conjunction with the accompanying drawings.

BRIEF DESCRIPTION OF THE DRAWINGS

FIG. 4 is an enlarged sectional view taken along the line 4—4 of FIG. 1.

FIG. 5 is an enlarged sectional view taken along the line 5—5 of FIG. 2.

DESCRIPTION OF THE PREFERRED EMBODIMENT

Figure 1:
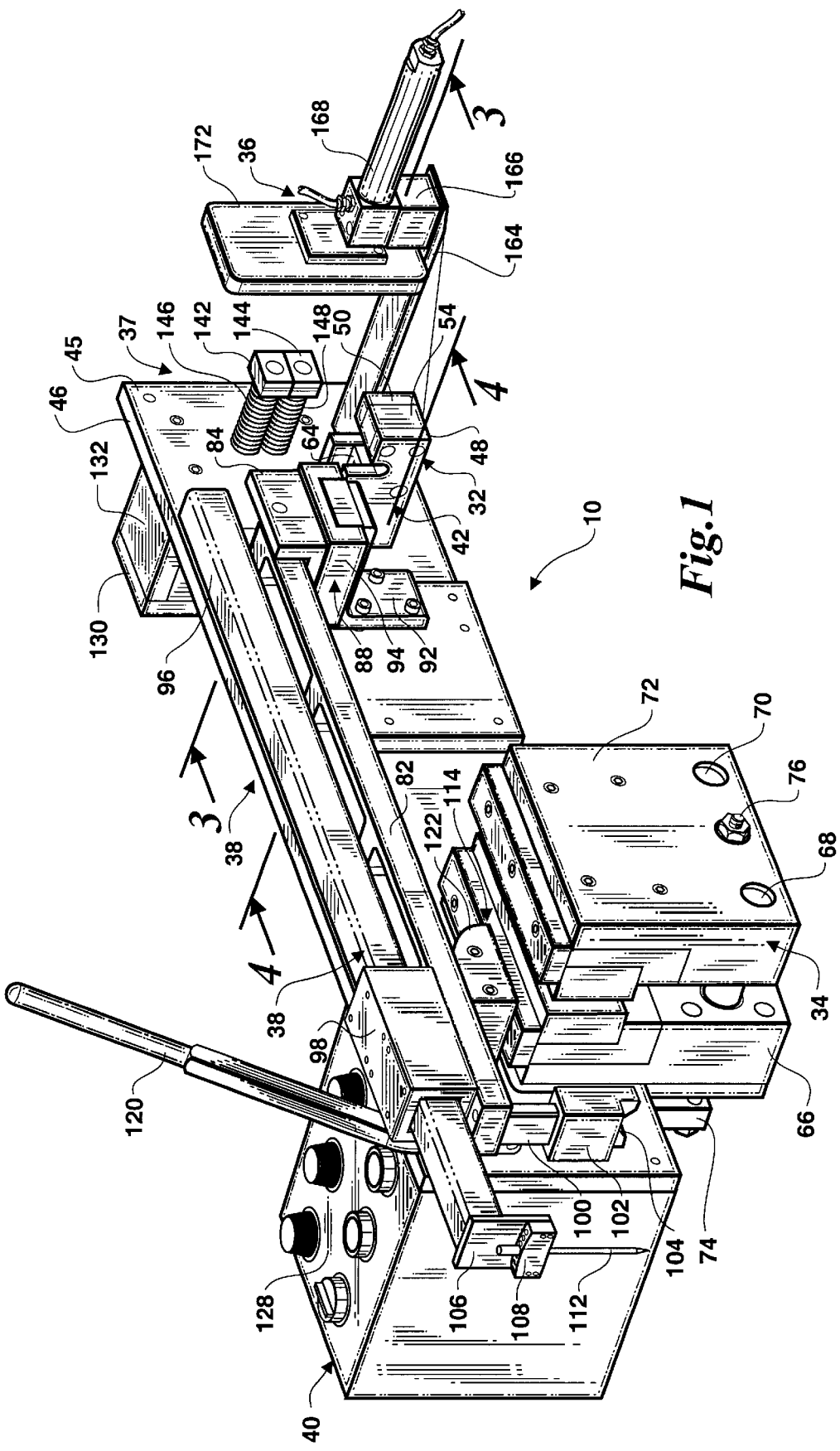
FIG. 1 is an isometric view of the grip alignment apparatus of the present invention illustrating the various features thereof.

In order to insure a complete understanding of the following description, a brief explanation of the golf club terminology used herein will now be given with particular reference being made to FIGS. 2 and 3. The golf club 12 shown in phantom lines includes the usual shaft 14 defining a longitudinal axis 16 and having a club head 18 on one end with a grip 20 installed on the opposite end 22 thereof. The golf club head 18 is provided with a hosel 24 by which the club head is affixed to the shaft 14 so that the hosel axis lies on the shaft axis 16. The club head 18 has a sole 26 and a ball striking face 28 with the intersection of the sole and the face being defined herein as the leading edge 30 of the golf club head. Most golf clubs are manufactured with what is commonly referred to as an "off-set". An off-set may be defined as the relationship between the shaft axis and the leading edge of the golf club face. When the shaft axis intersects the leading edge, there is no off-set and when they do not intersect there is off-set, and the amount of off-set will vary from club to club within a set of golf clubs.

Referring more particularly to the drawings, FIG. 1 shows golf club grip alignment apparatus of the present invention which is indicated generally by the reference numeral 10. As will hereinafter be described in detail, the apparatus 10 has a golf club holding mechanism that includes a hosel clamp 32 and a shaft clamp 34. The apparatus 10 also includes a golf club positioning device 36, a position indicator 37, a grip aligner 38, and a control mechanism 40.

As seen best in FIG. 4 the hosel clamp 32 of the golf club holding mechanism includes a housing 42 which is suitably attached to the front surface 45 of a vertical support plate 46 so that the housing extends normally from the support plate. The housing 42 has a pair of spaced apart vertically disposed side plates 48 and 50 which are interconnected at their lower longitudinal edges by a bar 52. A fixed jaw 54 is disposed so as to interconnect the extending ends of the vertical plates 48 and 50 by means of suitable fasteners. The vertical plates 48 and 50 have upwardly opening U-shaped slots 56 and 58 respectively, formed therein proximate the fixed jaw 54. When the golf club 12 is placed in the hosel clamp 32, the shaft 14 of the club will be supported in the smaller slot 56 of the plate 48 and the hosel 24 of the club will be supported in the larger slot 58 of the plate 50. The golf club is positioned in this manner so that the extending end of the hosel 24 is in abutting engagement with the inner surface of the vertical plate 48 whereby, the golf club will be in the proper axially disposed position within the apparatus 10.

A pneumatic cylinder 60 is mounted on the back surface 61 of the support plate 46 and has an actuator shaft 62 which passes through a suitable hole formed in the plate and a movable jaw 64 is carried on the extending end of the shaft 62. The movable jaw 64 is slidably supported on the upper surface of the bar 52 and is reciprocally movable between a hosel clamping position and a hosel released position. When the hosel clamp 32 is in the hosel released position, the golf club 12 will be cradled is the slots 56 and 58 and will be held thereby against lateral movement relative to the longitudinal axis 16 of the golf club shaft, but will be rotatably movable about the longitudinal axis 16 for reasons which will become apparent as this description progresses. When the hosel clamp 32 is in the hosel clamping position, the golf club 12 will be held against all movements, that is axial, rotational and lateral movements.

Figure 2:
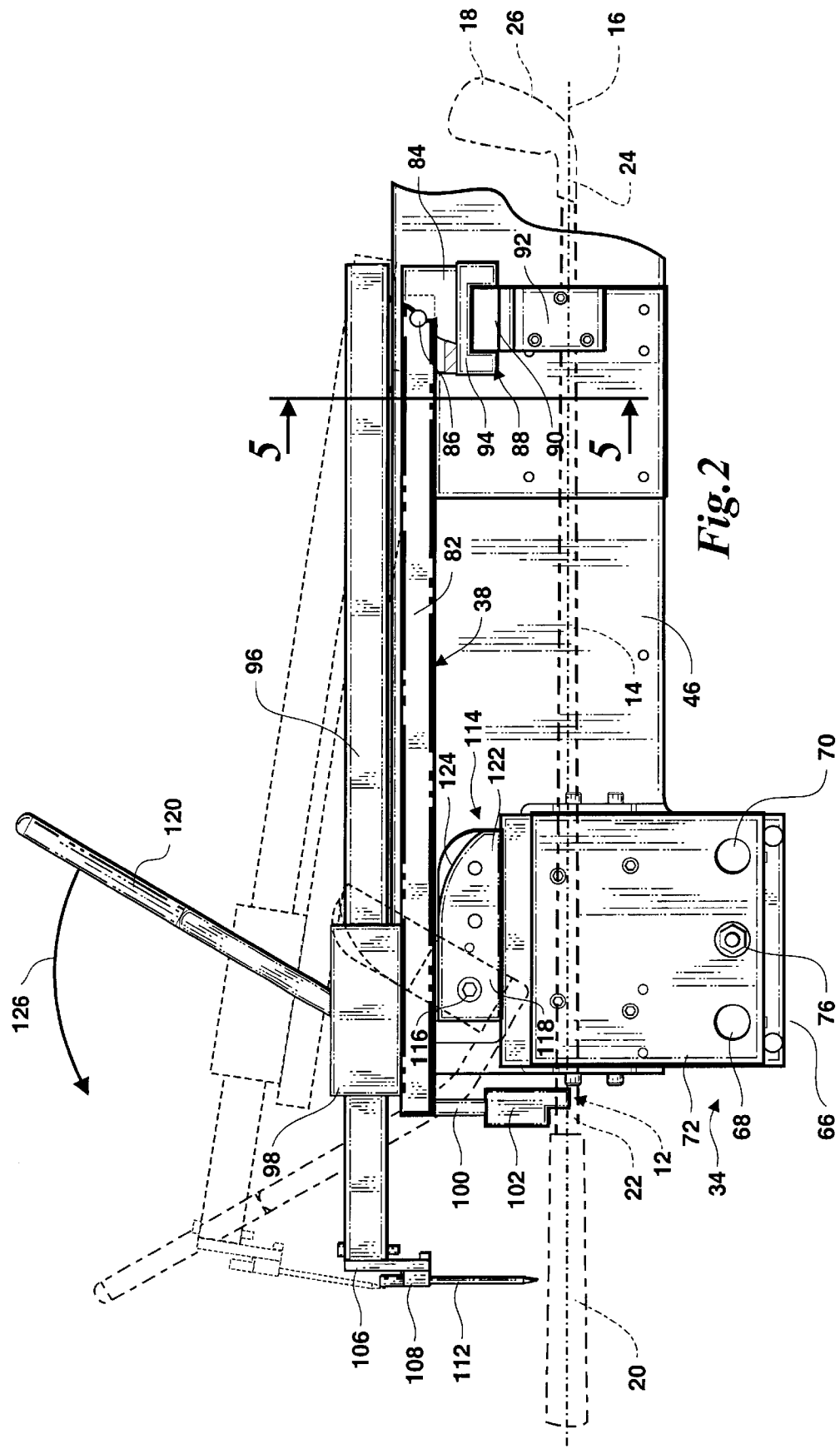
FIG. 2 is an enlarged fragmentary front elevational view of the apparatus shown in FIG. 1.
Figure 6:
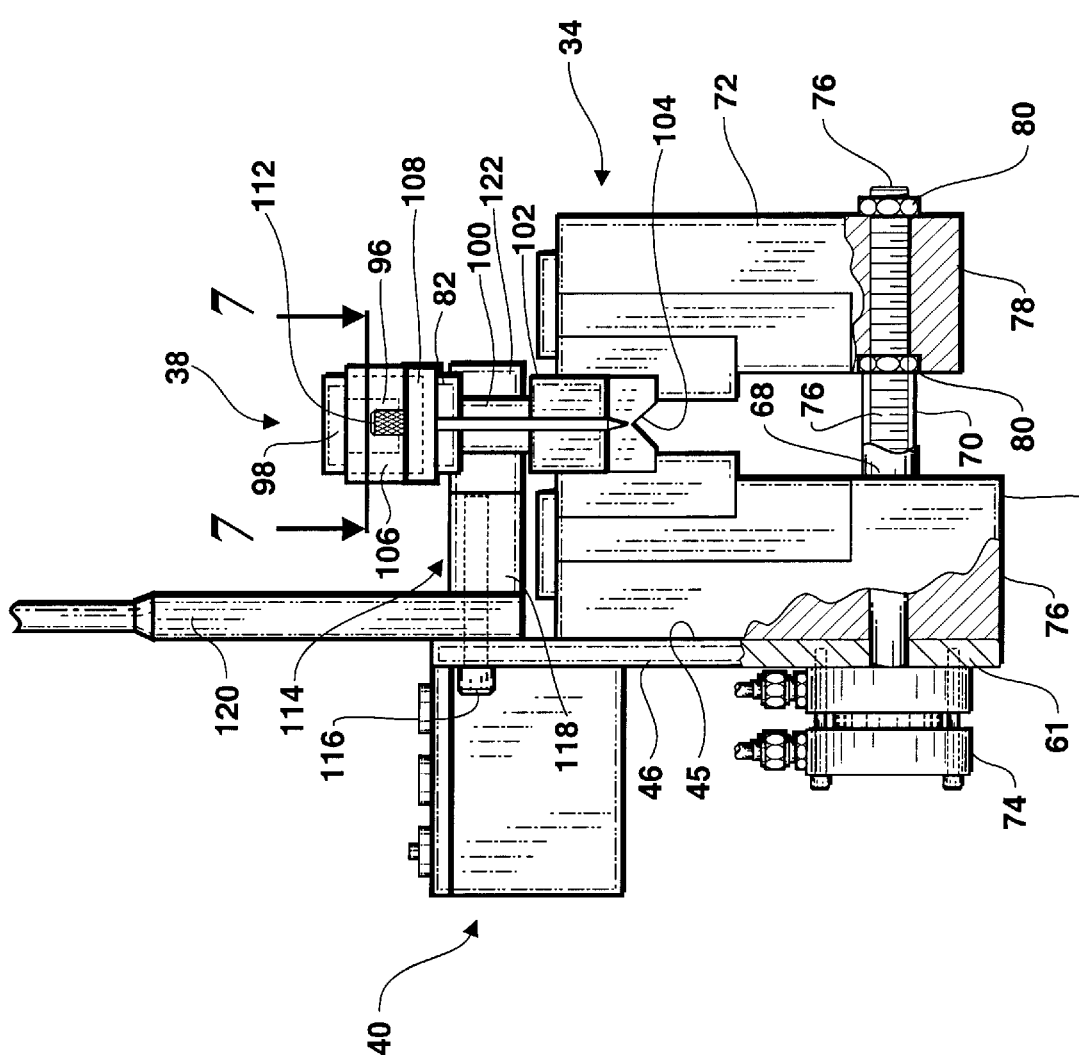
FIG. 6 is an end elevational view of the apparatus shown in FIG. 1.

Reference is now made to FIGS. 1, 2 and 6 wherein the shaft clamp 34 of the golf club holding mechanism is shown. The shaft clamp 34 includes a fixed jaw 66 which is mounted on the vertical support plate 46 and a pair of shafts 68 and 70 are carried by the fixed jaw and are disposed so as to extend normally therefrom. A movable jaw 72 is slidably carried on the shafts 68 and 70 for movement between a golf club shaft clamping position and a released position. A pneumatic cylinder 74 is mounted on the back surface 61 of the vertical support plate 46 and its actuator shaft 76 extends through suitable holes provided in the plate 46 and the fixed jaw 66. The actuator shaft 76 has a threaded end which is disposed in a bore 78 formed through the movable jaw 72 and is mounted therein by suitable jam nuts 80.

The grip aligner 38, as seen best in FIG. 2 includes an elongated alignment bar 82 with one end thereof mounted in a clevis 84 by means of a pivot pin 86. The clevis 84 as seen best in FIG. 5, is carried on a linear ball bearing slide 88 which has its stationary base 90 mounted on a bracket 92 that is in turn mounted on the vertical support plate 46. A carriage 94 is mounted on the stationary base 90 for sliding movement in a path that is perpendicular to the vertical support plate 46. Therefore, the movement path of the linear ball bearing slide 88, the clevis 84 which is mounted atop the carriage 94 and the alignment bar 82 is transverse to the longitudinal axis 16 of the golf club shaft 14 and the purpose for such movement will hereinafter be described in detail. The linear ball bearing slide 88 used in the practice of the present invention is identified as part no. 6203K13 and is available from the McMaster-Carr Supply Company of 9630 Norwalk Boulevard, Santa Fe Springs, Calif. 90670-2932.

An elongated square beam 96 is mounted on top of the alignment bar 82 for movement therewith in a path that is transverse to the longitudinal axis 16 of the golf club shaft 14. The square beam 96 is mounted atop the alignment bar 82 in a square bearing 98 with the square beam 96 being extensibly moveable through the bearing 98 in a path parallel to the longitudinal dimension of the alignment bar 82. The square beam 96 is identified as part no. 60255K413 and the square bearing 98 is identified as part no. 60255K11 and both are available from the McMaster-Carr Supply Company at the address given above. The linear ball bearing slide 88, the square beam 96 and the square bearing 98 are precision items which will produce very accurate and precise lateral and extensible movements of the grip aligner mechanism 38.

A plate 100 depends from the extending end of the alignment bar 82 and a registration device in the preferred form of a V-block 102 is dependingly carried on the lower end of the plate 100. When the grip aligner 38 is pivotably moved into the operating position as will hereinafter be described, the downwardly facing V-shaped opening 104 of the V-block 102 will come to rest in a straddling position on the golf club shaft 14. The lateral movement capability of the grip aligner 38 provided by the linear ball bearing slide 88 allows for golf clubs having different off-set dimensions to be gripped in the apparatus 10. When the V-block 102 is placed in a straddling positioned on the golf club shaft 14, the alignment bar 82 and the square beam 96 will be laterally moved as necessary to provide registered vertical alignment between the aligner 38 and the golf club shaft 14.

A plate 106 is dependingly carried on the extending end of the square beam 96 and an index carrier block 108 is mounted on the lower end of the plate and configured to extend transversely of the square beam. A plurality of holes 110 are formed in spaced increments through the carrier block 108 and a movable pointer 112 is placed in a selected one of the holes as determined by the desired alignment of the grip to be installed. In other words, if the grip is to be installed in a conventional manner wherein the plane containing the ridge formed in the grip is parallel to the plane containing the leading edge of the golf club head, the pointer will be installed in the central one of the plurality of holes 110. If customized grip installations are desired, then the pointer can be relocated to one side or the other of the central hole so that the grip will be installed in a rotated position and thereby induce the golfer to hold the club in a closed or open position when addressing the golf ball.

It will be appreciated that the square beam 96 is extensibly movable so that the pointer 112 can be located proximate the alignment mark or marks provided on a grip being installed. The alignment marks of different grips may not always be in the same place and the different length shafts used on the different golf clubs necessitates the extensible movement of the square beam if precise alignment is to be achieved.

As herein before mentioned, the alignment bar 82 is mounted on the clevis 84 by a pivot pin 86. Such mounting allows the entire grip aligner 38 to be pivotably moved between an operating position shown in solid lines in FIG. 2 and a club installing position shown in dashed lines in the same figure. This pivotably movement of the grip aligner 38 is accomplished by a manually operable cam mechanism 114 which is mounted on the support plate 46 by means of a pivot pin 116. The cam mechanism 114 includes a pivot block 118 that is carried on the pin 116 with a lever 120 being affixed to one end of the pivot block. A cam 122 is attached to the other end of the pivot block 118 and defines a cam surface 124. Movement of the lever 120 in the direction indicated by the arrow 126 in FIG. 2 will move the cam mechanism 114 from the solid line position to the dashed line position. Such movement will bring the cam surface 124 of the cam 122 into bearing engagement with the underside of the alignment bar 82 and thereby move the grip aligner 38 to its club installing position. As indicated by the name, when the grip aligner 38 is moved into the club installing position, the golf club 12 can be placed in the grip alignment apparatus 10 by the installer/operator of the apparatus.

Figure 3:
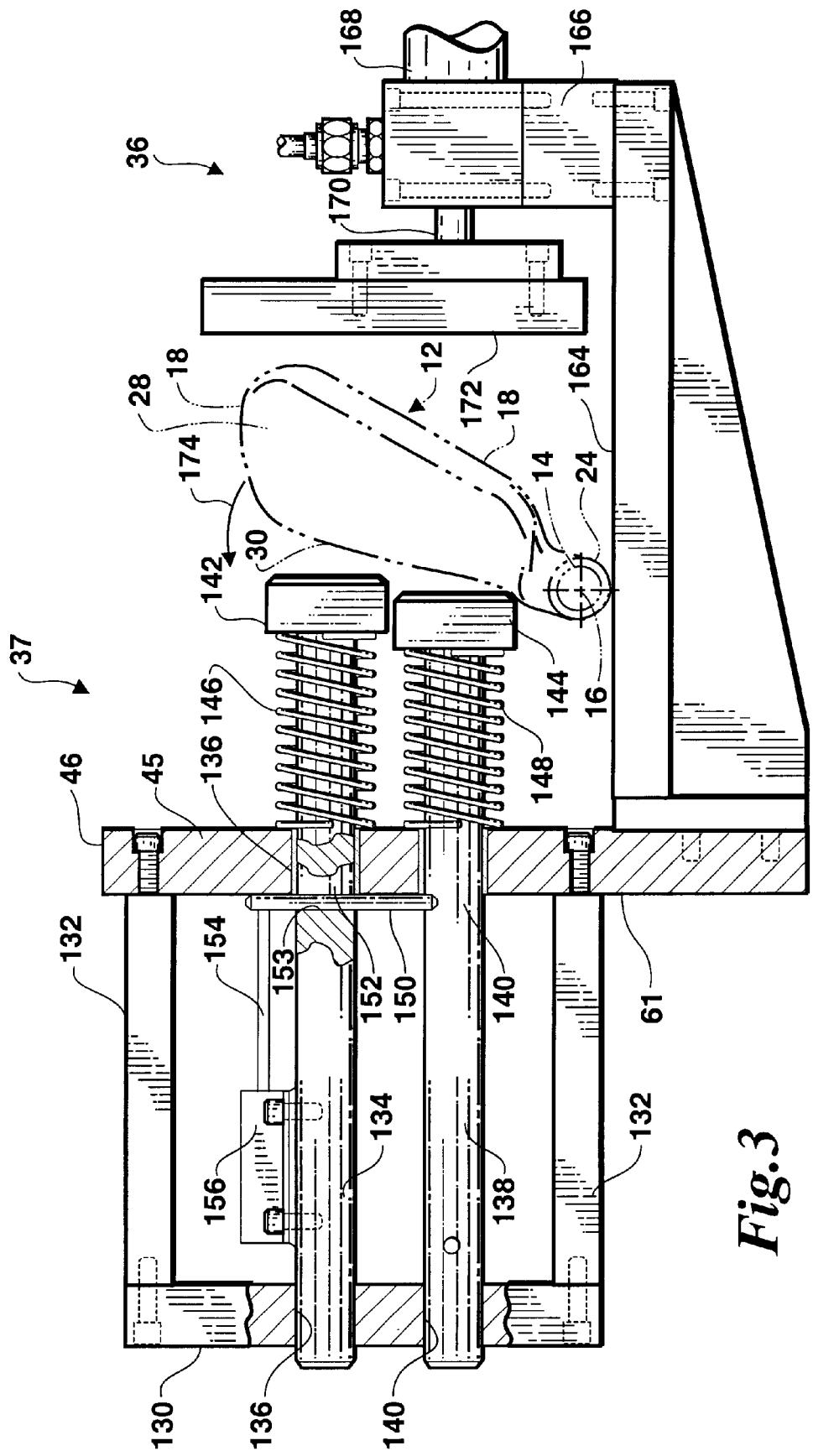
FIG. 3 is an enlarged sectional view taken along the line 3—3 of FIG. 1.
Figure 7:
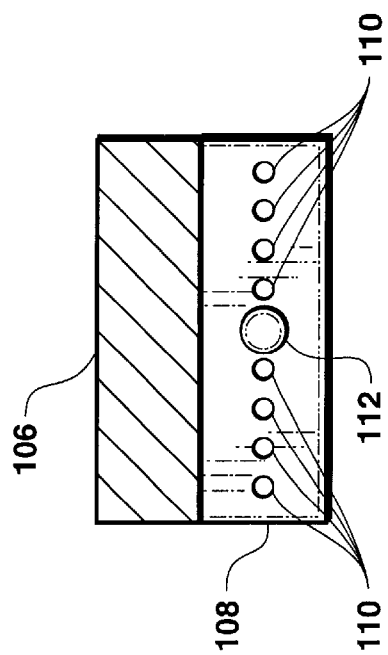
FIG. 7 is an enlarged sectional view taken along the line 7—7 of FIG. 6.
Figure 8:
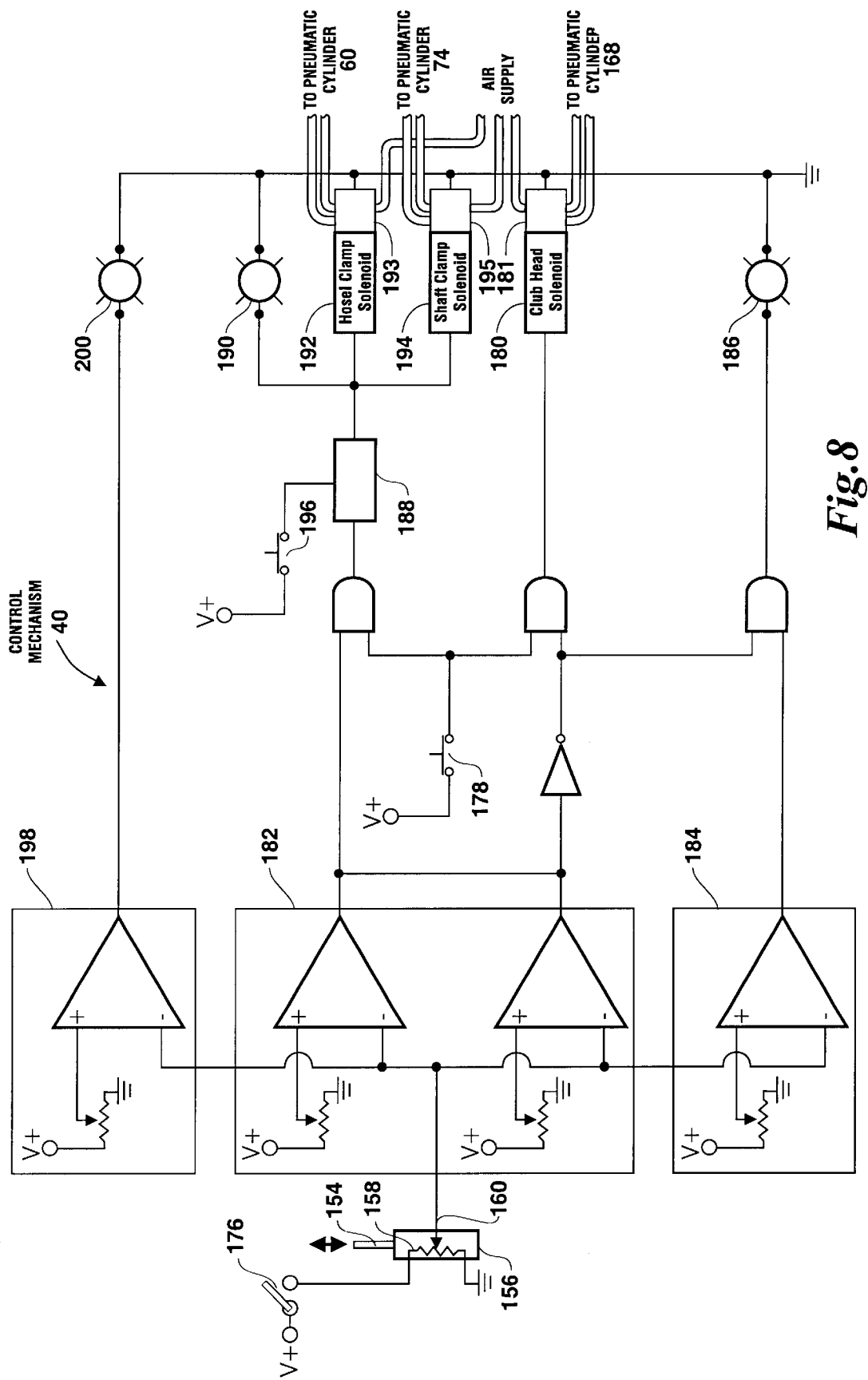
FIG. 8. Is a block diagram showing the electrical control functions of the apparatus of the present invention.

Reference is now made to FIG. 3 wherein the golf club position indicator 37 is best seen. A back plate 130 is carried by a vertically separated pair of spacer plates 132 which extend normally from the back face 61 of the support plate 46 to position the back plate 130 in a rearwardly spaced parallel relationship with the support plate 46. An upper slide rod 134 is mounted in a first aligned pair of holes 136 formed in the support plate 46 and the back plate 130, and a lower slide rod 138 is mounted in a second aligned pair of holes 140 provided in the support plate 46 and the back plate 130. The holes 136 and 140 are formed in the plates 46 and 130 so that the rods 134 and 138 are slidably movable in their respective pairs of holes and the rods are positioned in vertical alignment with each other. The forwardly extending end of the upper slide rod 134 is provided with a touch pad 142 and the lower slide rod 138 is similarly provided with a touch pad 144 on its extending end. The upper slide rod 134 is biased to an extended position by a compression spring 146 which is mounted concentrically on the rod and bears against the front surface of the support plate 46 and the inwardly facing surface of the touch pad 142. Similarly, the lower slide rod 138 is biased to an extending position by a compression spring 148 which is mounted concentrically on the rod 138 and bears against the front surface of the support plate 46 and the inwardly facing surface of the touch pad 144. A dowel 150 is suitably mounted on the lower slide rod 138 and extends normally upwardly therefrom though a slot 152 formed transversely through the upper slide rod 134 with the slot having an inwardly disposed end 153 and being elongated axially of the rod. The upper end of the dowel 150 is in engagement with the spring loaded normally extending plunger 154 of a linear motion sensor 156 which is mounted on the upper slide rod 134. The linear motion sensor, as seen in FIG. 8, includes a resistor 158 to which an input voltage is applied from a suitable source. A variable output voltage is present on a wiper 160 with the value of the output voltage being determined by the position of the wiper along the length of the resistor 158, and the position of the wiper 160 is determined by the position of the plunger 154. The linear motion sensor 156 is identified as part no. LP-15UL-B and is commercially available from the Midori America Corporation, 2555 E. Chapman Avenue, Suite 400, Fullerton, Calif. 92831.

Reference is made once again to FIG. 3. In the relaxed, or normal, position of the golf club position indicator 37, the dowel 150 carried by the lower slide rod 138 is biased by the compression spring 148 into bearing engagement with the back surface 61 of the support plate 46, thereby limiting the travel of the lower slide rod in the extended direction. The upper slide rod 134 is biased into its extended position by the compression spring 146 and its travel in that direction is limited by the inwardly disposed end 153 of the slot 152 which bears against the dowel 150.

When the installer places the club 12 in the apparatus 10, the hosel 24 of the club and the adjacent end of the shaft 14 will be cradled in the hosel clamp 32 in the manner hereinbefore described, and the club shaft 14 will extend through the jaws 66 and 72 of the shaft clamp 34. This initial positioning of the golf club 12 will place the head 18 of the club proximate the touch pads 142 and 144 of the position indicator 37 in the manner shown in FIG. 3. The golf club positioning device 36 is provided on the opposite side of the club head 18 and is disposed in alignment with the touch pads 142 and 144 of the position indicator. The positioning device 36 is supported on a mounting plate 164 which is suitably mounted on the front face 45 of the support plate 46 so as to extend normally therefrom. The club positioning device 36 includes a riser block 166 supported on the mounting plate 164 and a pneumatic cylinder 168 is mounted on the riser block. The actuator shaft 170 of the pneumatic cylinder 168 has a club head pusher plate 172 mounted on its extending end and the pusher plate 172 is reciprocally movable into engagement with the club head 18 to rotate it about the longitudinal axis 16 of the golf club shaft 14.

When the golf club head is initially rotated in the direction of the arrow 174 in FIG. 3, it will move into bearing engagement with the touch pad 144 and move the lower slide rod 138 in the retracted direction against the bias applied by the spring 148. Retracting the lower slide rod 138 in this manner will produce a retracted movement of the upper slide rod 134 by virtue of the dowel 150 bearing against the inwardly disposed end 153 of the slot 152 formed in the upper slide rod 134. Continued rotation of the club head 18 will bring it into engagement with the upper touch pad 142 and cause the upper slide rod 134 to retract independently of the movement of the lower slide rod 138. When the leading edge 30 of the golf club 12 reaches a vertical position, the touch pads 142 and 144 will be in vertical alignment with each other and the dowel 150 will be located in approximately the center of the slot 152. Such movements of the touch pads 142 and 144 of the position indicator 37 will cause the dowel 150 to depress the plunger 154 of the linear motion sensor 156 to produce a predetermined output voltage value which, as will hereinafter will be described, indicates that the leading edge 30 of the golf club head 18 has been rotated into the desired vertical position.

The operator of the apparatus 10 installs the golf club to be gripped with his or her right hand and controls the operation of the apparatus 10 with the left hand which is within easy reach of the control panel 128 which is part of the control mechanism 40 mounted on the back surface 61 of the support plate 46 in the position shown in FIG. 6.

OPERATION

To start operation of the apparatus 10 the operator closes the on-off switch 176 seen in FIG. 8, and depresses the clamp switch 178 and holds it closed. When the clamp switch 178 is depressed, a first solenoid 180 is energized to apply air from a suitable source through a switching valve 181 to the pneumatic cylinder 168 to extend its actuator shaft 170 for rotating the club head 18 about the longitudinal axis 16 of the club shaft 14. Closing the on-off switch 176 also applies the voltage to the linear position sensor 156 and the output voltage of the sensor will change as the club head is rotated toward the desired position. The output voltage of the linear position sensor 156 is monitored by a comparator 182 which is adjusted to set an upper voltage threshold and a lower voltage threshold. The comparator 182 will produce an output voltage when the monitored output voltage of the position sensor 156 is between the two threshold values and that output voltage value is the hereinbefore described predetermined value which indicates that the leading edge 30 of the golf club head 18 is in the desired vertical position. The output voltage of the linear position sensor 156 is also monitored by a negative level detector 184 which is set at a voltage which is lower than the lower voltage threshold setting of the comparator 182. The negative level detector 184 will produce an output voltage to turn on a club negative tilt lamp 186 when the club head is being rotated toward the desired position and the monitored voltage value is between the setting of the negative level detector 184 and the lower threshold setting the comparator 182. When the club head being rotated reaches the desired position the negative level detector 184 will no longer produce a voltage and the negative tilt lamp 186 will be extinguished and the first solenoid 180 will be de-energized to stop the rotational movement of the golf club head 18.

Also, when the golf club head being rotated reaches the desired position, the output voltage of the comparator 182 is applied through a latching circuit 188 to turn on the club aligned lamp 190, and energize both the hosel clamp solenoid 192 and the shaft clamp solenoid 194 which position their respective switching valves 193 and 195 to direct air form the suitable air supply the pneumatic cylinders 60 and 74. At that point, the operator can release the clamp switch 178 and the latching circuit 188 will maintain the energized states of the club aligned lamp 190, and the solenoids 192 and 194 which operate the hosel and shaft clamps. 32 and 34 respectively. The latching circuit 188 will maintain the energized states of those components until the operator depresses the unclamp switch 196.

The output voltage of the linear position sensor 156 is also monitored by a positive level detector 198 which is set at a voltage value above the upper threshold setting of the comparator 182. In the event that the club head being rotated is rotated beyond the desired vertical position, the output voltage of the linear position sensor 156 will increase to a value above the upper threshold setting of the comparator 182 and the positive level detector 198 will produce a voltage that turns on a positive tilt lamp 200 to advise the operator of such an occurrence. This will usually not occur unless the operator manually rotates the club head 18 beyond the desired vertical position, and if this should occur, the operator will be alerted and operation of the apparatus 10 will need to be restarted.

When the golf club 12 has been clamped in the desired position by energizing of the hosel and shaft clamps 32 and 34, and the grip aligner 38 has been pivotably moved into the operating position, the club is ready for installation of the grip 20 by using installation techniques well known in the art. When installation is completed, the operator depresses the unclamp switch 196 which as hereinbefore mentioned de-energizes the hosel and shaft solenoids 192 and 194 to move the hosel and shaft clamps 32 and 34 to their unclamped positions thus allowing the operator to remove the gripped club and repeat the operation for the next club to be gripped.

Although the preferred embodiment of the invention has been illustrated and described herein, it will be understood that many modifications and variations may readily occur to those skilled in the art.

For example, rotational movement of the golf club 12 to move the leading edge 30 of the club head 18 into the desired vertical position could be accomplished by the operator who would turn the club by hand instead of using the above described golf club positioning device 36. Also, the pneumatic cylinders 60, 74 and 168 could be replaced with hydraulic rams, or other functionally equivalent devices.

Therefore, it is intended that the following claims be construed to cover such modifications and variations.

What is claimed is:

1. An apparatus for positioning and holding a head of a golf club, which includes a shaft having one end thereof attached to the head, in a predetermined position and providing a visual indication of that position of the head to a location proximate an opposite end of the shaft to facilitate aligned installation of a grip on the opposite end of the shaft, said apparatus comprising:

a) a vertical support plate;

b) a holding mechanism mounted on said support plate for receiving the golf club to be gripped and having an unclamped state in which the received golf club is free for rotational movement about the longitudinal axis of its shaft and a clamped state in which the received golf club is held fast against any movement;

c) a golf club position indicator mounted on said support plate for engaging the head of the golf club when it is received by said holding mechanism and producing an electric signal when the head of the received golf club is rotated into the predetermined position;

d) said holding mechanism coupled to receive the electric signal from said position indicator and being actuated from the unclamped state to the clamped state upon receiving the electric signal;

e) an aligner coupled to said support plate and disposed in coextending parallel relationship with the shaft of the golf club when the golf club is received by said holding mechanism to provide visual alignment between the predetermined position of the head and the opposite end of the shaft of the golf club so that an installer can position the grip being installed in alignment with the predetermined position of the head of the golf club;

f) said position indicator being located on one side of the head of the golf club when the golf club is received in said holding mechanism; and g) a positioning device mounted on said support plate and located on the opposite side of the head of the golf club when the golf club is received in said holding mechanism, said positioning device including a pusher plate movable into and out of engagement with the head of the received golf club to rotate the golf club about the longitudinal axis of the shaft and move a leading edge formed at an intersection of a face and a sole of the head into a vertical position which is the predetermined position of the received golf club, and actuator means coupled to said pusher plate for movement thereof toward and away from the head of the golf club when the golf club is received in said holding mechanism.

2. An apparatus as claimed in claim 1 wherein said holding mechanism comprises:

a) a hosel clamp defining a spaced apart pair of upwardly opening U-shaped slots in which hosel and an adjacent portion of the shaft of the golf club are positioned when the golf club is received in said holding mechanism, said hosel clamp having an unclamped state in which the received golf club is free for rotational movement about the longitudinal axis of the golf club shaft and a clamped state in which the received golf club is held fast against such rotational movement; and b) a shaft clamp including a fixed and a movable jaw positioned adjacent the extending end of the shaft of a received golf club and having an unclamped position wherein the jaws of the shaft clamp are out of engagement with the shaft of the received golf club and a clamped position wherein the jaws of the shaft clamp are in engagement with the shaft of the received golf club.

3. An apparatus as claimed in claim 2 wherein said hosel clamp comprises:

a) a spaced apart pair of vertical plates each one of which has one of the U-shaped slots defined by said hosel clamp formed therein;

b) a bar interconnecting the lower longitudinal edges of said pair of plates;

c) a fixed jaw interconnecting the extending ends of said pair of plates and positioned on one side of the pair of U-shaped slots;

d) a movable jaw positioned on the opposite side of said pair of U-shaped slots and slidably movable on said bar toward and away from said fixed jaw; and e) actuator means connected to said movable jaw for reciprocally moving said movable jaw.

4. An apparatus as claimed in claim 2 wherein said shaft clamp comprises:

a) a fixed jaw positioned on one side of the shaft of the golf club when the golf club is received in said holding mechanism;

b) a spaced apart pair of shafts extending normally from proximate the lower end of said fixed jaw;

c) a movable jaw carried on said pair of shafts and positioned on the opposite side of the shaft of the golf club when the golf club is received in said holding mechanism, said movable jaw being slidably movable on said pair of shafts toward and away from said fixed jaw; and d) actuator means connected to said movable jaw for reciprocally moving said movable jaw.

5. An apparatus as claimed in claim 1 wherein said golf club position indicator comprises:

a) a pair of spaced apart vertical plates;

b) a lower slide rod mounted in said pair of vertical plates for movement toward and away from the head of the golf club when it is received in said holding mechanism, said lower slide rod having a dowel extending vertically upwardly therefrom;

c) an upper slide rod, mounted in said pair of vertical plates and disposed in vertical alignment with said lower slide rod, said upper slide rod being movable toward and away from the head of the golf club when it is received in said holding mechanism, said upper slide rod having a slot formed there through with the dowel carried by said lower slide rod extending through the slot;

d) a pair of touch pads each mounted on a different one of said lower and upper slide rods at the ends thereof which are adjacent the head of the golf club when it is received in said holding mechanism;

e) a pair of compression springs each concentrically mounted on a different one of said lower and upper slide rods for biasing thereof toward the golf club head when it is received in said holding mechanism and positioning said lower and upper slide rods so that said pair of touch pads are vertically mis-aligned when the head of the received golf club is not in the predetermined position and allowing movement of said pair of touch pads into vertical alignment with each other when the head of the received golf club engages said pair of touch pads and is moved into the predetermined position; and f) a linear position sensor mounted on said upper slide rod for movement therewith, said linear position sensor having a spring loaded plunger extending therefrom into engagement with the dowel carried by said lower slide rod, said linear position sensor producing the electric signal when said pair of touch pads are moved into vertical alignment with each other.

6. An apparatus as claimed in claim 1 wherein said aligner comprises:

a) a linear slide device mounted on said support plate adjacent and in upwardly spaced relationship with respect to the head of the golf club when the golf club is received in said holding mechanism, said linear slide being moveable toward and away from said support plate;

b) an elongated alignment bar having a first end coupled to said linear slide device for movement therewith and a second end disposed proximate the extending end of the shaft of the received golf club;

c) a registration member depending from the second end of said alignment bar for engaging the extending end of the shaft of the received golf club and positioning said alignment bar in vertically aligned upwardly spaced relationship with respect to the shaft of the received golf club;

d) an elongated beam mounted on said alignment bar in coextensive relationship therewith, said beam having an extending end proximate the extending end of the shaft of the received golf club and being longitudinally extensible for adjustable positioning of the extending end of said beam with respect to the extending end of the shaft of the received golf club;

e) a carrier block depending from the extending end of said beam in an overlaying position relative to the extending end of the shaft of the received golf club; and f) a pointer mounted in said carrier block and depending therefrom into proximity with the extending end of the shaft of the received golf club to indicate the proper aligned position of the grip to be installed on the shaft of the received golf club.

7. An apparatus as claimed in claim 6 wherein said registration device is a V-block having a downwardly facing V-shaped opening for straddling the shaft of the golf club when it is received in said holding mechanism.

8. An apparatus as claimed in claim 6 wherein said carrier block extends transversely of said elongated beam and has a plurality of incrementally spaced holes formed therein in which said pointer is selectively positionable.

9. An apparatus as claimed in claim 6 wherein said alignment bar is pivotably mounted on said linear slide device for movement of said aligner into an upwardly pivoted position to allow placement of the golf club to be gripped in said holding mechanism and a downwardly pivoted position wherein said alignment bar and said elongated beam are in coextensive parallel relationship with the shaft of the golf club when it is positioned in said holding mechanism.

10. An apparatus as claimed in claim 6 and further comprising:

a) a clevis mounted on said linear slide device;

b) a pivot pin mounting the first end of said alignment bar in said clevis for coupling the first end of said alignment bar to said linear slide device;

c) a cam pivotably on said support plate below said alignment bar; and d) a lever attached to said cam for pivotably moving said cam into bearing engagement with said alignment bar to pivotably move said aligner into an upwardly disposed position to allow placement of the golf club to be gripped in said holding mechanism and for pivotably moving said cam out of bearing engagement with said alignment bar to move said aligner into a coextensive parallel relationship with the shaft of the golf club when the golf club is placed in said holding mechanism.

11. An apparatus for positioning and holding a leading edge formed at an intersection of a face and a sole of a head of a golf club, which includes a shaft having one end thereof attached to the head, in a vertical position and providing an indication of that position of the head to a location proximate an opposite end of the shaft to facilitate aligned installation of a grip on the opposite end of the shaft, said apparatus comprising:

a) a vertical support plate;

b) a holding mechanism mounted on said support plate for receiving a golf club to be gripped and having an unclamped state in which the received golf club is free for rotational movement about the longitudinal axis of its shaft and a clamped state in which the received golf club is held fast against any movement;

c) a golf club position indicator mounted on said support plate for engaging the head of a golf club when it is received by said holding mechanism and producing a first electric signal when the leading edge of the head of the received golf club is not in the vertical position and producing a second electric signal when the leading edge of the head of the received golf club is rotated into the vertical position;

d) a control circuit connected to receive the first and second signals produced by said position indicator and couple the received signals to said holding mechanism;

e) said holding mechanism being in the unclamped state when receiving the first signal from said control circuit and in the clamped state when receiving the second signal from said control circuit;

f) an aligner coupled to said support plate and disposed in coextending parallel relationship with the shaft of the golf club when the golf club is received by said holding mechanism to provide visual alignment between the vertical position of the leading edge of the head and the extending end of the shaft of the golf club so that an installer can position the grip being installed in alignment with the vertical position of the head of the golf club;

g) said position indicator being located on one side of the head of the golf club when the golf club is received in said holding mechanism; and h) a positioning device mounted on said support plate and located on the opposite side of the head of the golf club when the golf club is received in said holding mechanism, said positioning device including
a pusher plate movable into and out of engagement with the head of the received golf club to rotate the golf club about the longitudinal axis of the club shaft and move the leading edge of the club head into the vertical position, and
actuator means coupled to said pusher plate for movement thereof toward and away from the head of the golf club when the golf club is received in said holding mechanism.

12. An apparatus as claimed in claim 11 wherein said holding mechanism comprises:

a) a hosel clamp defining a spaced apart pair of upwardly opening U-shaped slots in which a hosel and an adjacent portion of the shaft of the golf club are positioned when the golf club is received in said holding mechanism, said hosel clamp having an unclamped state in which the received golf club is free for rotational movement about the longitudinal axis of the golf club shaft and a clamped state in which the received golf club is held fast against such rotational movement; and b) a shaft clamp including a fixed and a movable jaw positioned adjacent the extending end of the shaft of a received golf club and having an unclamped position wherein the jaws of the shaft clamp are out of engagement with the shaft of the received golf club and a clamped position wherein the jaws of the shaft clamp are in engagement with the shaft of the received golf club.

13. An apparatus as claimed in claim 12 wherein said hosel clamp comprises:

a) a spaced apart pair of vertical plates each one of which has one of the U-shaped slots defined by said hosel clamp formed therein;

b) a bar interconnecting the lower longitudinal edges of said pair of plates;

c) a fixed jaw interconnecting the extending ends of said pair of plates and positioned on one side of the pair of U-shaped slots;

d) a movable jaw positioned on the opposite side of said pair of U-shaped slots and slidably movable on said bar toward and away from said fixed jaw; and e) actuator means connected to said movable jaw for reciprocally moving said movable jaw.

14. An apparatus as claimed in claim 12 wherein said shaft clamp comprises:

a) a fixed jaw positioned on one side of the shaft of the golf club when the golf club is received in said holding mechanism;

b) a spaced apart pair of shafts extending normally from proximate the lower end of said fixed jaw;

c) a movable jaw carried on said pair of shafts and positioned on the opposite side of the shaft of the golf club when the golf club is received in said holding mechanism, said movable jaw being slidably movable on said pair of shafts toward and away from said fixed jaw; and d) actuator means connected to said movable jaw for reciprocally moving said movable jaw.

15. An apparatus as claimed in claim 11 wherein said golf club position indicator comprises:

a) a pair of spaced apart vertical plates;

b) a lower slide rod mounted in said pair of vertical plates for movement toward and away from the head of the golf club when it is received in said holding mechanism, said lower slide rod having a dowel extending vertically upwardly therefrom;

c) an upper slide rod, mounted in said pair of vertical plates and disposed in vertical alignment with said lower slide rod, said upper slide rod being movable toward and away from the head of the golf club when it is received in said holding mechanism, said upper slide rod having a slot formed there through with the dowel carried by said lower slide rod extending through the slot;

d) a pair of touch pads each mounted on a different one of said lower and upper slide rods at the ends thereof which are adjacent the head of the golf club when it is received in said holding mechanism;

e) a pair of compression springs each concentrically mounted on a different one of said lower and upper slide rods for biasing thereof toward the golf club head when it is received in said holding mechanism and positioning said lower and upper slide rods so that said pair of touch pads are vertically misaligned when the head of the received golf club is not in the vertical position and allowing movement of said pair of touch pads into vertical alignment with each other when the head of the received golf club engages said pair of touch pads and the leading edge of the head of the golf club is moved into the vertical position; and f) a linear position sensor mounted on said upper slide rod for movement therewith, said linear position sensor having a spring loaded plunger extending therefrom into engagement with the dowel carried by said lower slide rod, said linear position sensor producing the first electric signal when said pair of touch pads are vertically misaligned and producing the second electric signal when said pair of touch pads are moved into vertical alignment with each other.

16. An apparatus as claimed in claim 11 wherein said aligner comprises:

a) a linear slide device mounted on said support plate adjacent and in upwardly spaced relationship with respect to the head of the golf club when the golf club is received in said holding mechanism, said linear slide being moveable toward and away from said support plate;

b) an elongated alignment bar having a first end coupled to said linear slide device for movement therewith and a second end disposed proximate the extending end of the shaft of the received golf club;

c) a registration member depending from the second end of said alignment bar for engaging the extending end of the shaft of the received golf club and positioning said alignment bar in vertically aligned upwardly spaced relationship with respect to the shaft of the received golf club;

d) an elongated beam mounted on said alignment bar in coextensive relationship therewith, said beam having an extending end proximate the extending end of the shaft of the received golf club and being longitudinally extensible for adjustable positioning of the extending end of said beam with respect to the extending end of the shaft of the received golf club;

e) a carrier block depending from the extending end of said beam in an overlaying position relative to the extending end of the shaft of the received golf club; and f) a pointer mounted in said carrier block and depending therefrom into proximity with the extending end of the shaft of the received golf club to indicate the proper aligned position of the grip to be installed on the shaft of the received golf club.

17. An apparatus as claimed in claim 16 wherein said registration device is a V-block having a downwardly facing V-shaped opening for straddling the shaft of the golf club when it is received in said holding mechanism.

18. An apparatus as claimed in claim 16 wherein said carrier block extends transversely of said elongated beam and has a plurality of incrementally spaced holes formed therein in which said pointer is selectively positionable.

19. An apparatus as claimed in claim 16 wherein said alignment bar is pivotably mounted on said linear slide device for movement of said aligner into an upwardly pivoted position to allow placement of the golf club to be gripped in said holding mechanism and a downwardly pivoted position wherein said alignment bar and said elongated beam are in coextensive parallel relationship with the shaft of the golf club when it is positioned in said holding mechanism.

20. An apparatus as claimed in claim 16 and further comprising:

a) a clevis mounted on said linear slide device;

b) a pivot pin mounting the first end of said alignment bar in said clevis for coupling the first end of said alignment bar to said linear slide device;

c) a cam pivotably mounted on said support plate below said alignment bar; and d) a lever attached to said cam for pivotably moving said cam into bearing engagement with said alignment bar to pivotably move said aligner into an upwardly disposed position to allow placement of the golf club to be gripped in said holding mechanism and for pivotably moving said cam out of bearing engagement with said alignment bar to move said aligner into a coextensive parallel relationship with the shaft of the golf club when the golf club is placed in said holding mechanism.

* * * * *